United States Patent [19]
Beard

[11] Patent Number: 5,751,398
[45] Date of Patent: May 12, 1998

[54] MOTION PICTURE DIGITAL SOUND SYSTEM AND METHOD

[75] Inventor: Terry D. Beard, Westlake Village, Calif.

[73] Assignee: Digital Theater System, Inc., Westlake Village, Calif.

[21] Appl. No.: 620,825

[22] Filed: Nov. 29, 1990

Related U.S. Application Data

[63] Continuation-in-part of Ser. No. 590,294, Sep. 28, 1990, abandoned.

[51] Int. Cl.⁶ .................................................. G03B 31/00
[52] U.S. Cl. ........................ 352/236; 352/5; 352/15; 352/19; 352/20; 352/31; 352/37; 352/92
[58] Field of Search .......................... 352/5, 12, 37, 352/92, 236, 15, 19, 31, 20

[56] References Cited

U.S. PATENT DOCUMENTS

| | | | |
|---|---|---|---|
| 3,666,356 | 5/1972 | Williams | 352/27 |
| 4,040,026 | 8/1977 | Gernelle | 364/239.1 |
| 4,215,920 | 8/1980 | Butler | 352/92 |
| 4,235,531 | 11/1980 | McCormick | 352/27 |
| 4,306,781 | 12/1981 | Mosely | 352/92 |
| 4,381,541 | 4/1983 | Baumann et al. | 364/239.1 |
| 4,423,482 | 12/1983 | Hargrove et al. | 364/239.1 |
| 4,504,130 | 3/1985 | Bell et al. | 352/92 |
| 4,527,233 | 7/1985 | Ambrosius et al. | 364/239.1 |
| 4,600,280 | 7/1986 | Clark | 352/37 |
| 4,839,733 | 6/1989 | Karamon et al. | 358/341 |
| 4,860,193 | 8/1989 | Bentley et al. | 364/239.1 |
| 4,893,921 | 1/1990 | Beauviala | 352/92 |
| 4,938,585 | 7/1990 | Weiffenbach et al. | 352/92 |

FOREIGN PATENT DOCUMENTS

| | | | |
|---|---|---|---|
| 5233503 | 3/1977 | Japan | 352/27 |
| 8504024 | 9/1985 | WIPO | |
| WO9014614 | 11/1990 | WIPO | |

OTHER PUBLICATIONS

"SMPT Recommended Practice RP 115–1983", Society of Motion Picture and Television Engineers, 1983.
Hickman, Time Code Handbook, Cipher Digital, Inc., 1984, pp. 1–30.
Lambert, "Digital Audio for Film", MIX, Sep. 1990, pp. 17–23.
Sweeney, "Cinema Digital Sound", Sound & Communications, Nov., 1990, pp. 39–45.
Barringer Resources, Inc., Apr. 20, 1990 News Release and Strong–Ballantyne, Jul. 9, 1990 News Release.
Eargle, "Digital, My Dear Tracy", Audio, Dec., 1990, pp. 34,38.
"French Announce Optical", Pro Sound News—Europe, Nov., 1990.

*Primary Examiner*—David M. Gray
*Attorney, Agent, or Firm*—Koppel & Jacobs

[57] ABSTRACT

A digital time code is printed in an area of a motion picture film, between the normal analog optical sound track and the picture frames, that is exposed along with the sound track when a print is made. This area is partially redeveloped, and normally reserved to isolate the analog sound track from the picture frames. Digital audio for the motion picture is stored in a large capacity high integrity archival digital storage system. The time codes corresponding to known locations on the film are read as the film is played, and in an anticipatory pass the digital audio signals for these frames are transferred to a fast access data storage buffer which temporarily stores the data before it is converted to analog format for theater play. The time code is read with light that is absorbed by the film dyes produced when the film is developed. Temporary storage of the digital audio signal in the buffer memory accommodates breaks in the film, projector changeover and various time code validation schemes, and allows the digital data source in which the digital audio data is stored to be a relatively slow access high data reliability device such as a digital tape.

7 Claims, 6 Drawing Sheets

5,751,398

MOTION PICTURE DIGITAL SOUND SYSTEM AND METHOD

RELATED APPLICATION

This is a continuation-in-part of application Ser. No. 07/590,294, filed Sep. 28, 1990 abandoned.

BACKGROUND OF THE INVENTION

1. Field of the Invention

This invention relates to systems and methods for recording and utilizing sound tracks on motion picture films.

2. Description of the Related Art

Current motion picture films employ analog sound recording techniques. Most motion pictures use an analog optical sound track that is printed onto the film along with the picture, and is optically scanned to reproduce the sound. Another technique is to record the sound onto magnetic strips that are coated along the edges of the film; this process is used for example in producing "Dolby® 70 mm Sound".

Optical sound tracks can become dirty and produce a noisy output. Magnetically recorded sound tracks are subject to noise problems similar to those encountered with other audio tapes. It would be highly desirable to upgrade the quality of motion picture sound to a level comparable to that achieved with a compact disc.

It has previously been proposed to replace the analog optical sound track with a digital sound track that digitally encoded the sound. Although theoretically this could be used to give a higher quality sound reproduction, it would be quite expensive to both record the numerous small digital data bits and to provide equipment for reading them back, and the tightly compacted data could give rise to its own noise problems. In addition, it would be difficult to reliably print such digital tracks using conventional film laboratory methods. There would also be a limit to the number of sound tracks that could be encoded onto the film. Since the digital track preempts the normal analog optical sound track two kinds of prints would have to be made and distributed, one with a digital sound track and the other with an analog sound track; if a digital print were sent to a theater without digital play capability, it could not be shown. Furthermore, a theater playing a digital print would have no backup in case of a failure of the digital reader.

SUMMARY OF THE INVENTION

The purpose of the present invention is to provide a digital sound encoding technique for movie films that is compatible with an analog optical sound track on the same film, is less subject to noise than previous techniques, is relatively inexpensive to implement, can work with a large number of sound tracks, provides an analog backup in case of any failure in the digital system, and is printable with standard laboratory processing.

Both an analog sound track and a digital time code are placed on a motion picture sound film. The digital time code is located proximate to the picture frames in an area of the film that is unoccupied by either the picture frames or the analog sound track, and provides a digital identification of the code's location on the film. The digital audio data itself is stored in a large capacity high reliability archival storage device, rather than on the film.

When the time code for a particular location is read from the film, the digital audio data is accessed from a fast access, digital data storage buffer to which the digital audio data has previously been transferred from the large base archival storage device in anticipation of its being needed in a "virtual" memory scheme. The audio data is retrieved from the buffer, converted to analog form, and played in synchronism with the projection of the film frame. For this purpose, the digital time code for film location is read from the film and used by the microprocessor controlled system to transfer data from the fast access buffer memory to the D to A converter and to transfer data in an anticipatory fashion from the large capacity digital data storage device to the fast access buffer memory before it is to be used. In this "virtual" mode of operation, the digital audio for a specific location on the film can be instantly accessed from the fast access buffer. This allows for synchronization with jumps in the film due to lost frames or projector "changeover", without having to instantly physically change the large archival digital audio memory reading location.

The digital time code is preferably located between the picture frames and the analog sound track, in a partially redeveloped area of the film that also includes color film dyes. As opposed to the analog sound track that is readable only by infrared light, the digital time code is read by light that is absorbed by the color dyes, such as light from a light emitting diode. The time code area effectively isolates the redevelopment of the audio sound track from the picture frames.

Various "fail-safe" software routines can be implemented to assure that valid time codes are read, such as requiring time codes for at least two successive frames in a new series of frames before a jump can be made to the new series. This protects against simple time code reading errors. The analog sound track can be used in theaters having only analog sound reproduction equipment, and can also serve as a backup in case of a failure in the digital system.

These and other features and advantages of the invention will be apparent to those skilled in the art from the following detailed description, taken together with the accompanying drawings, in which:

DETAILED DESCRIPTION OF THE INVENTION

The present invention provides a way to have digital audio in addition to a normal analog optical sound track on a motion picture film. This is accomplished by providing a time code track on the film that synchronizes an outside digital sound source to the picture. The time code is positioned on the film so that is does not interfere in any way with the conventional optical sound track or with the picture, is highly reliable and easy to record, and can be printed with normal film laboratory equipment and within normal laboratory standards.

The time code is placed in an area on the print between the normal optical sound track and the picture. This area conventionally serves to isolate the optical sound track area from the picture, and is normally deliberately avoided when printing the sound track. It lies within the area exposed by the laboratory sound track printing head but outside the area exposed by the normal laboratory picture printing head. It lies well outside the area scanned by the normal optical sound playback head on a projector so that it does not interfere with the normal optical sound track.

Figure 1:
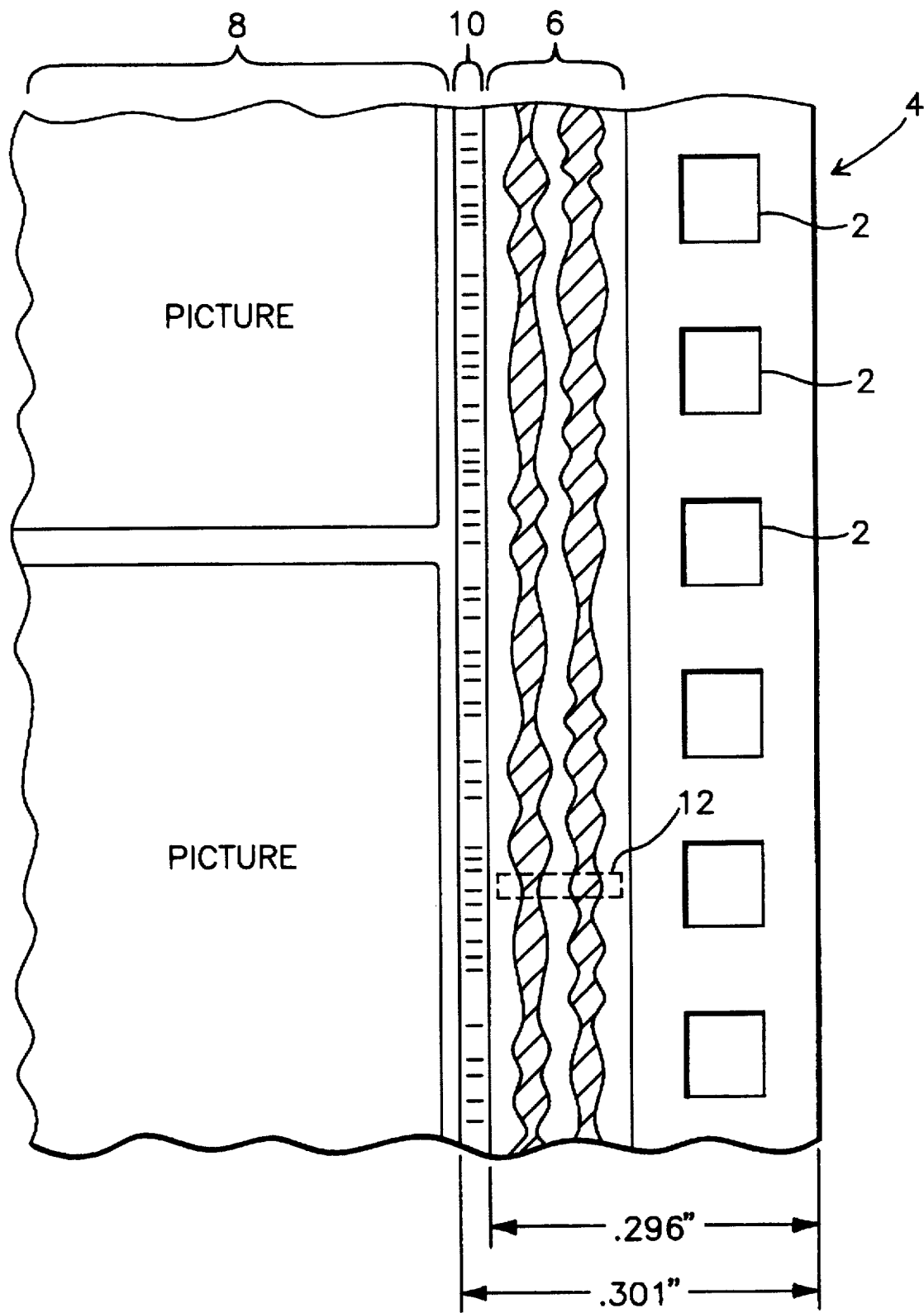
FIG. 1 is an enlarged fragmentary view of a motion picture film segment that includes both a conventional analog sound track and a digital time code in accordance with the invention.

A piece of 35 mm release motion picture film that carries the new digital time code is shown in FIG. 1. A series of sprocket holes 2 lie between the edge 4 of the film and the normal optical sound track area 6. The picture frames are printed by a picture printing head in an area 8 that is spaced inward from sound track area 6. The intervening area 10 is used for the digital time code of the present invention. This area is exposed by the normal laboratory sound track printing head, but not by the picture printing head.

Color film such as that shown in FIG. 1 is normally formed with three light sensitive silver halide layers corresponding to red, green and blue light. Colored light from the negative exposes the layers, which are then developed. During development, dyes are released within the layers corresponding to yellow, magenta and cyan. However, the theater lamp used to play back the optical sound track is incandescent, emitting infrared radiation to which the color dyes in the film are transparent. Accordingly, after normal color processing and before the final fix the sound track area 6 is redeveloped by an "application" process back to silver. The redeveloper is either rolled or prayed onto the sound track area. This process is not precisely controlled, but it is important that the redevelper not extend into the picture area, since this would in effect blacken it. Accordingly, the area 10 is normally left vacant as a buffer zone to separate the optical sound track from the picture frames.

Conventions have been established within the film industry for the division of 35 mm film into its various functional areas. The edge of the picture frame area 8 that is exposed by the picture aperture extends to 0.304 inch±0.002 inch from the film edge 4. In exhibition projectors a slit, indicated by dashed line 12, limits the width of the optical sound track scanning so as to avoid sensing light passed through the sprocket holes 2 or picture area 8. Because the sound track scanners in film projectors are sensitive to infrared light, release print sound tracks are redeveloped as described above, producing an optical sound track whose dark areas are opaque to infrared light. The projector slit extends away from film edge 4 to a limit of 0.286±0.001 inch so as to avoid any unapplicated areas, and the optical sound track is accordingly limited to the area read by the slit. The area from 0.287 to 0.302 inch from film edge 4 is thus available for recording the digital time code of the present invention. This area is normally considered unusable for either picture or sound printing, since an unpredictable part of it is redeveloped and the remainder is not.

The preferred area used for the digital time code extends from 0.296 to 0.301 inch from film edge 4, providing a 0.005 inch wide time code track. Removing the time code track 0.010 inch from the area scanned by the optical sound track slit in the projector eliminates any chance of crosstalk into the normal sound track. Because the time code track occupies an area that is sometimes redeveloped, sometimes not redeveloped, and sometimes only partially redeveloped, where it appears as a clear code on an otherwise opaque track, it cannot be read reliably with an infrared (unfiltered incandescent) light source such as that used to read the optical sound track. Instead, the time code should be read using a light source which emits energy absorbed by the dyes in color film. A light emitting diode or a filtered incandescent source can be employed for this purpose.

The time code is a digital data string that uniquely identifies the location along the film. The code preferably comprises a 24-bit digital word, with the time code word beginning with a synchronizing series of bits.

Figure 2:
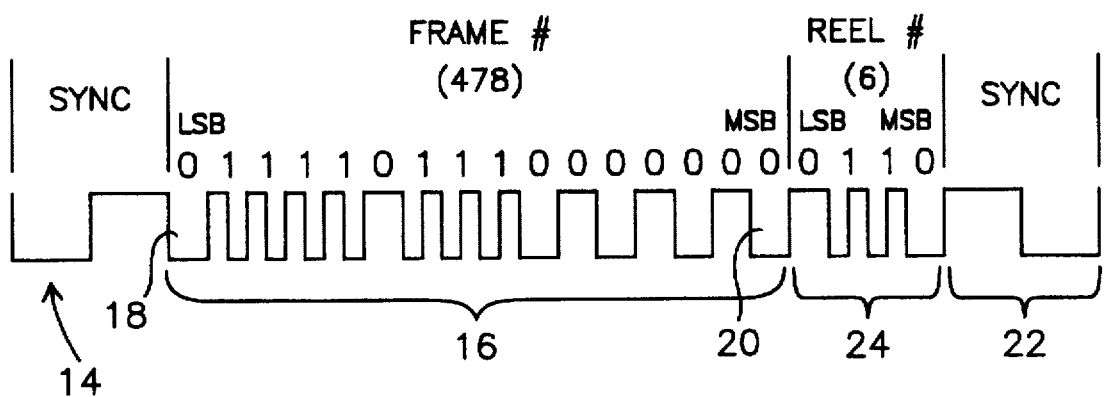
FIG. 2 is an illustration of a digital time code that can be used to identify locations on the film.

An example of one frame of a suitable time code is shown in FIG. 2. This is the time code word for frame number 478 on reel number 6. A sync signal 14 for the frame is provided at the beginning of the time code word. The frame number is identified by a 16-bit binary word 16, with the least significant bit position identified by numeral 18 and the most significant bit position by numeral 20. This is followed by a 4-bit word 24 that identifies the reel number, and then a sync word 22 for the following frame. The type of coding illustrated is known as biphase mark coding, and is self-clocking. A constant level (either "high" or "low") during a given bit indicates a digital "0", while a transition between two levels (either high to low or low to high) is a digital "1".

There may be a direct correspondence between the time code frames and the picture frames, i.e., each time code frame locates a particular picture frame. This is not necessary, or in fact the optimum arrangement. The spacing of the time code frames can be selected somewhat arbitrarily, since its function is to provide an indication of location along the film at any given time. Whereas 35 mm film is normally played at 24 picture frames per second, it is advantageous to use a 30 frames per second time code because a 30 frame rate is more easily "synced" with conventional digital audio tape machines when mastering the sound track.

Figure 3:
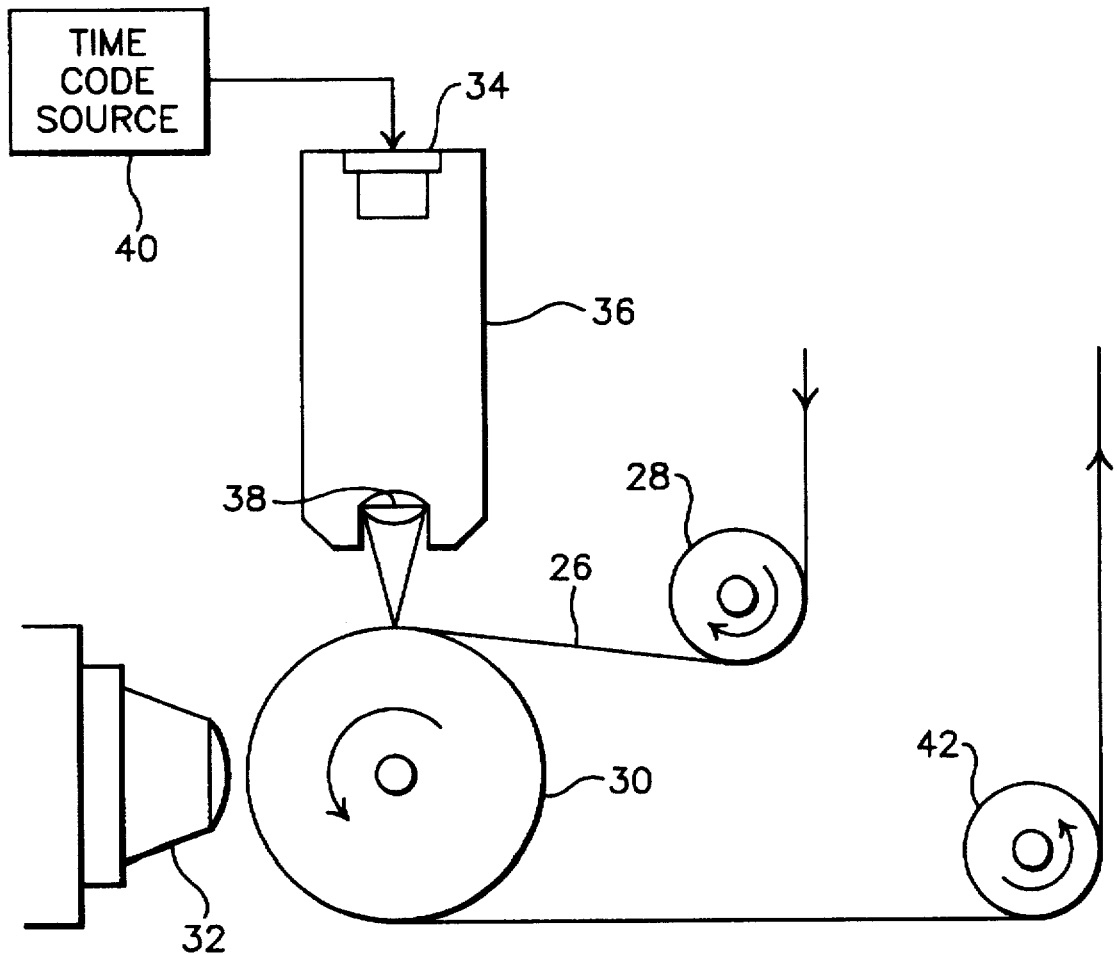
FIG. 3 is a simplified assembly drawing showing a system for recording both the digital time code and an analog sound track on a movie film.

FIG. 3 shows a system for recording both the digital time code and the analog sound track on the film sound track negative. The negative film 26 passes over an idler roller 28 on its way to an inertial sound drum 30. The normal analog sound track is exposed onto the negative through lens assembly 32. The digital time code is exposed onto the optical sound track negative at the same time the sound track negative is being recorded. A light source 34 is positioned at one end of a housing 36 and emits radiation that is focused by a lens 38 at the other end of the housing onto the time code portion of the film. Light source 34 is preferably a high efficiency green light emitting diode (LED), such as an AND, Inc. 180PGP diode. The LED is imaged directly onto the sound track negative film by lens 38, preferably as a 0.005 inch diameter spot. The LED is turned on and off in response to the time code signal to be recorded, which is provided by a suitable digital time code signal source 40. The time code is exposed on the film in a location that will be proximate to the corresponding picture on the film print. The analog optical sound track for that portion of the film is then recorded when the film is passed under recording head 32. The film is removed via an idler wheel 42 for normal application redevelopment.

Figure 4:
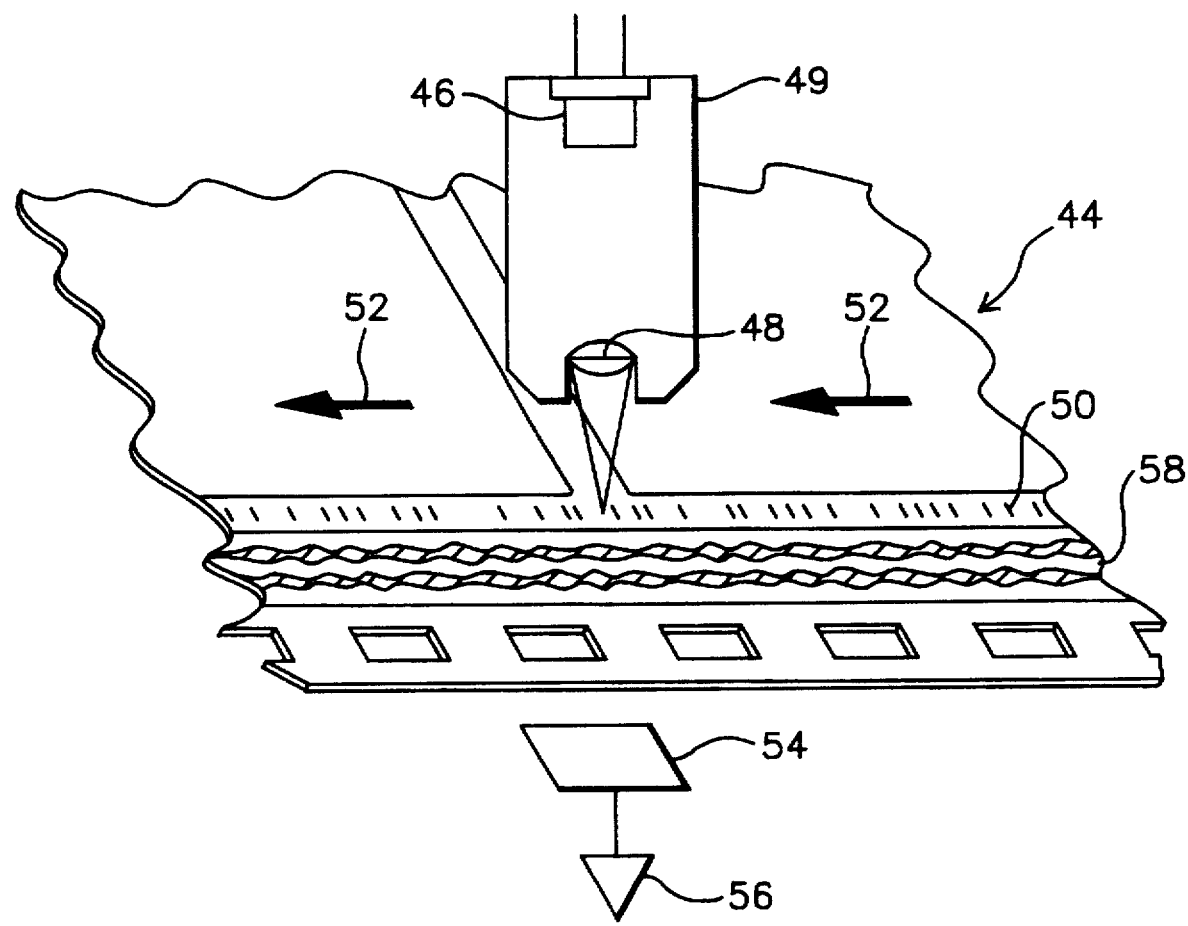
FIG. 4 is a simplified fragmentary perspective view showing a system for reading the digital time code from the film.

A time code playback system is illustrated in FIG. 4.

The release film print 44 passes under a time code reading head before advancing to the projector aperture. The reading head illuminates the digital time code area with light that is absorbed by the developed film dyes. A high efficiency red LED 46, such as an AND, Inc. 180CRP device, is preferably used for this purpose. The LED 46 is imaged onto the time code track by lens 48, preferably as a 0.005"×0.010" rectangular spot; both the LED 46 and lens 48 are held in a common housing 49. With the standard 35 mm film described above, this allows for reading the time code with up to 0.005 inch film weave. The time code track is indicated by numeral 50, with the film moving in the direction of arrows 52.

Light passing through the time code track 50 falls upon a photocell 54, the output of which is amplified by amplifier 56 to provide the digital time code signal used to control audio playback. With the preferred film dimensions described above in connection with FIG. 1, reading of the time code 50 is unaffected by the analog sound track 58.

Figure 5:
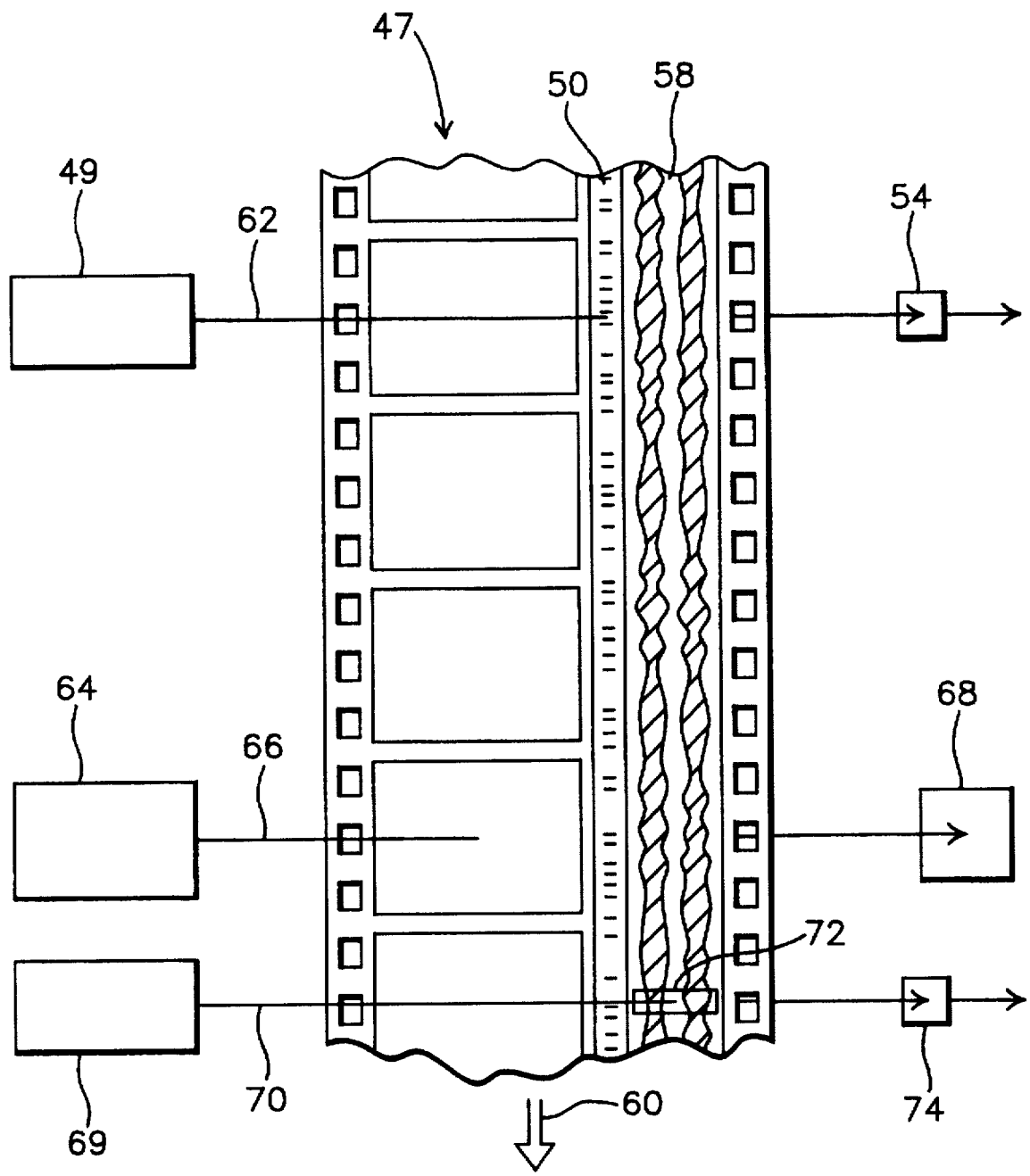
FIG. 5 is a block diagram illustrating a dual digital/analog reading system for the digital time code and analog sound track.

FIG. 5 illustrates the sequence in which the print film 44 which has been recorded as shown in FIG. 4, is read during theater projection. Assume the film is moving past the projection facilities in the direction of arrow 60. It first passes the digital time code reading head in housing 49, which reads the time code with a colored beam 62 that strikes detector 54 on the opposite side of the film. The film then advances to projection lamp 64. A beam 66 from lamp 64 projects the picture frames onto the theater screen 68. The film then advances to a third source 69, whose beam 70 is transmitted through a slit 72 over the optical sound track area 58 and onto a detector 74, which produces the normal analog audio signal.

In normal operation, either the digital time code 50 or the audio sound track 58, could be read. FIG. 5 illustrates the independence of the two sound mechanisms, and that neither one interferes with the other. In case of a failure somewhere in the digital system, the analog sound track can be used as a backup. In theaters where no digital reading facilities are available, only the analog sound track would be utilized.

It should be noted that the picture frames are illuminated by the projection lamp 64 a predetermined period of time after their respective time codes have been read, as determined by the spacing between time code lamp housing 49 and projector 64, and the film speed. This allows time for processing the time code signal, and for checking its validity and accessing the proper digital audio data in the fast random access "virtual" buffer memory. Processing of the time code signal and the production of sound therefrom is synchronized with the illumination of the picture frames so that the frames are displayed on the screen at the same time the sound derived from their respective digital time codes is played in the theater.

Figure 6:
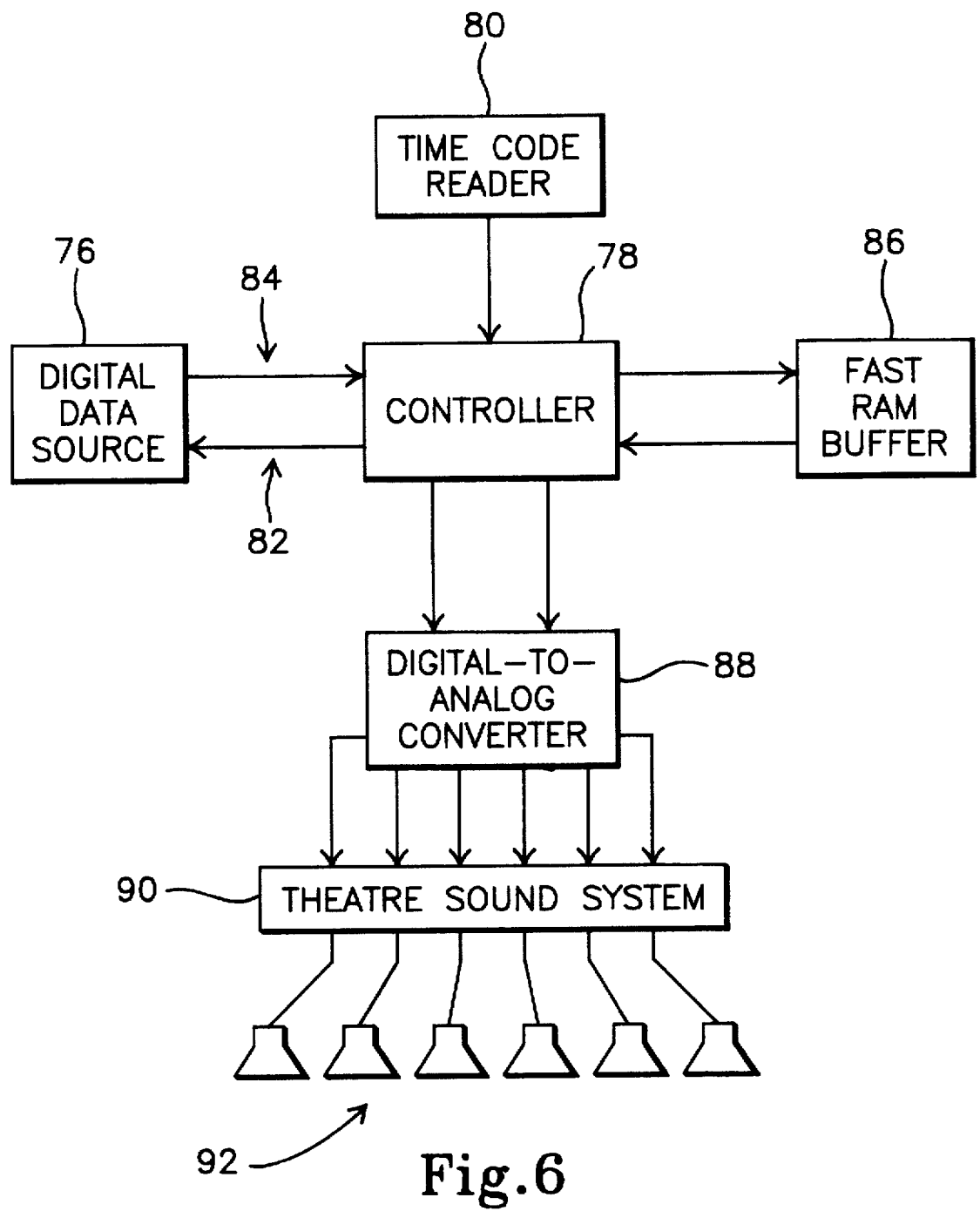
FIG. 6 is a block diagram of a system for processing time codes read from a film into an audio signal.

A system that can be used to produce an audio output in the theater in response to the recorded digital time code is shown in FIG. 6. Digital audio data for the entire movie is stored in a large capacity high reliability archival digital data source 76. The digital audio data is preferably stored in a compressed form using a method such as that described in U.S. Pat. No. 4,882,585 by the present inventor, issued Nov. 21, 1989 for "Method and Apparatus for High Resolution Analog-Digital-Analog Transformations". This compression allows more time and more channels of audio information to be recorded in the same amount of space. Other digital audio data compression techniques could also be used. The archival digital data source may be one or more disk drives, or preferably a more portable and economical means such as digital audio tape (DAT) drives such as the Sony Corp. Model SDT 1000. A multi-track audio source to be recorded on the tape may be produced by either a multi-track digital or analog tape machine. In the case of a digital tape machine, the digital data can be transferred directly to the DAT medium. If an analog audio source is used, the analog data is converted to digital form by conventional analog-digital conversion, using an analog-digital converter such as the Crystal Semiconductor Model CS 5326. The sampling clock in the converter is phase locked to the tape master to assure synchronous recording. The sample frequency can be the standard 44.1 KHz or 48 KHz that provides 20—20 KHz frequency response.

The entire recording process is preferably managed on an IBM-compatible microcomputer system. The digital data is transferred from the analog-to-digital converters used to convert the audio data to digital format to the master DAT tape or other such storage medium, via an SCSI data system in the computer. The digital data is transferred to the DAT tape and addressed in blocks that are matched to the time coded words of the digital time codes recorded on the motion picture print. The finished DAT tapes can be duplicated in a conventional digital-to-digital duplication method. Two DAT drives are preferably used for audio playback, each DAT containing the data for three audio channels, for a total capability of six channels. Instead of a DAT or disk drive, a compact disc or any other suitable large digital source may be used, such as magneto optic discs, 8 mm digital tapes, or optical tape.

Returning to FIG. 6, a microprocessor controller 78 receives the time code data from the time code reader 80 (shown in more detail in FIG. 4). The film travel time from the location of the time code reader head to the projection aperture is set in the controller so that the time for converting the digital audio data originally stored in data source 76 to an analog signal is known exactly.

The controller 78 accesses digital data source 76 via access line 82, and causes it to transfer digital audio data in anticipation of its being required via data channel 84 to a fast random access buffer memory 86. The digital data is stored by the controller in the buffer memory 86.

With an IBM AT® base system, several megabytes of RAM storage can be provided for this purpose. Use of this large intermediate rapid access memory is an important feature of the invention. The large fast access buffer allows instantaneous jumps within it to maintain synchronous sound when parts of the motion picture have been lost in editing or at projector "changeovers". The microprocessor system anticipates the data that is apt to be required and transfers it in block from the slower non-random access archival source; in this case the DAT sources. The digital audio data is transferred from the digital data source 76 into the memory 86, where it is stored for several seconds before being retrieved and transferred to a series of digital-to-analog converters 88. This allows the system to accommodate projector changeovers and unexpected jumps in the motion picture that can occur if some frames of the movie are damaged in projection and subsequently removed. In such event the controller rapidly accesses the buffer to obtain the necessary digital audio data for delivery to the digital-to-analog converters 88. Because of the buffer action of memory 86, the digital data source 76 can have relatively slow random access properties, making it practical to use devices such as a DAT as the digital data source.

The ability of the system to accommodate jumps in the normal sequence of time code frames is illustrated in FIGS.

Figure 7A:
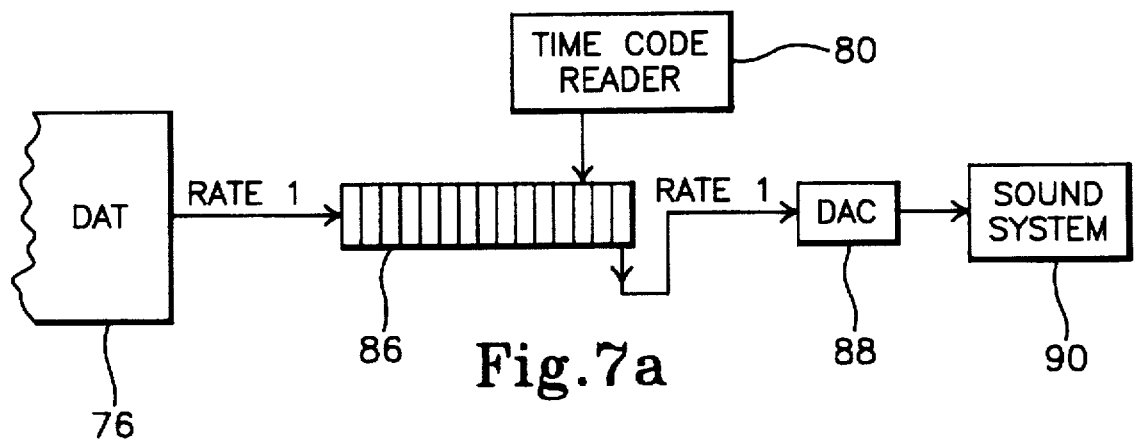
FIGS. 7a–7c are block diagrams illustrating the virtual memory operation when a jump is detected between successive time code words.

7a–7c. At any given time the buffer 86 will hold the audio data for the time code frame currently being played, the audio data for as many subsequent sequential time code frames as is desired and for which there is sufficient buffer capacity, and also previously read time code frames if an ability to reverse jump is desired. In FIG. 7a, the buffer 86 is illustrated as holding the audio data for the time code frame currently being read by time code reader 80, plus the audio data for all of the subsequent time code frames up to the buffer's capacity. For example, for a six channel system operating with a 48 KHz sampling rate and the digital data reduction method of U.S. Pat. No. 4,882,585, a 16 megabyte RAM will provide approximately one minute of buffer memory. The data moves from left to right through the buffer 86. Current audio data is read out to the DACs 88, after the built-in delay established by the film travel time between the time code reader head and the projection aperture, for application to the theater sound system 90, at the same average rate that anticipatory future data is fed into the buffer from the DAT 76 or other digital data source. Since data is transferred from the tape to the buffer at a faster rate than data is read out of the buffer, the tape periodically pauses while data is being read out from the buffer, and restarts to fill the buffer back up.

Figure 7B:
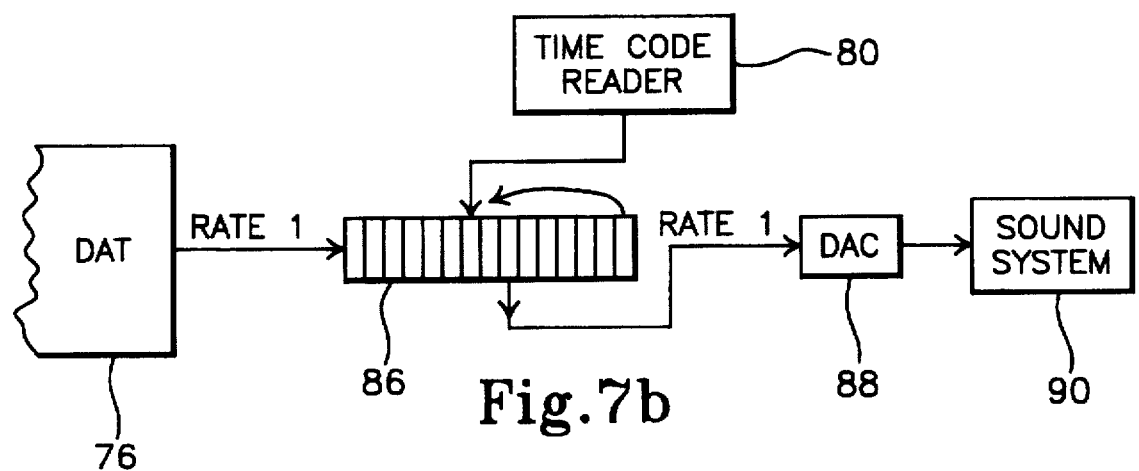

In FIG. 7b, the time code reader 80 sees a break in the time code sequence, with a jump from one time code frame to a later frame, skipping a number of intermediate frames. The buffer readout system responds with the same jump, skipping virtually instantaneously to the audio data which corresponds to the new out-of-sequence time code frame. At this instant data is still being read out of buffer 86 at the same average rate data is written into the buffer from DAT 76.

Figure 7C:
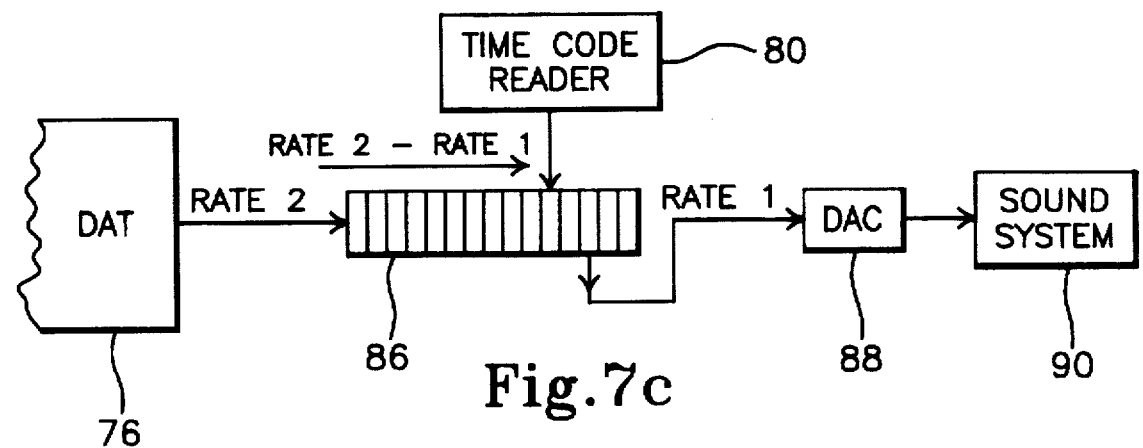

The system's subsequent accommodation to the jump is illustrated in FIG. 7c. The maximum DAT data output rate is greater than the buffer data output rate, so that new anticipatory data is written into the buffer faster than current data is read out. For example, for a sampling rate of 44,100 samples/second, the buffer data out rate could be 264.6 K bytes/second and the two DAT's maximum data out rate 366 K bytes/second. The differential in data flow rates continues until the buffer is again storing its full anticipatory capacity, at which time the DAT data output average rate reverts to that of the output of the buffer to the DACs.

Again referring to FIG. 6, the digital-to-analog converters 88 convert the digital audio data to output analog signals, preferably in the form of 6 full bandwidth 20—20 KHz outputs. The analog output signals are passed directly to the audio inputs of the theater sound system 90 which feeds speakers 92.

The buffer time provided by memory 86, and the fact the time code is read prior to the projection aperture, also allows various software routines to be performed to assure the validity of the time codes that are read, and to correct for possible system or film errors. For example, an internal timer within the system keeps track of the rate at which the successive frame time codes are read. If no time code signal is received at the time expected, the internal timer may be used to play the audio signal corresponding to the next expected time code. The buffer time may also be used to validate new time codes when there is a jump in the time code sequence. For example, assume that the time codes 35, 36 and 37 are read initially, followed by a jump to the time codes 265, 266 and 267 because of a film splice. A software routine can be programmed to prevent the audio signals for the second series of frames from being played unless at least two sequential valid frames in the new series are read.

The new digital sound system thus allows for a very flexible and reliable playback of digital movie sound while accommodating a normal analog optical sound track on the same film. Since numerous variations and alternate embodiments will occur to those skilled in the art, it is intended that the invention be limited only in terms of the appended claims.

I claim:

1. A motion picture sound film, comprising:

a motion picture color film having a series of picture frames on a developed portion of the film that is substantially transparent to infrared radiation, an analog sound track generally parallel to said picture frames on a redeveloped portion of the film that is readable by infrared radiation, and a buffer area between said picture frames and sound track having a portion that is developed and a portion that is redeveloped, the redeveloped portion of the buffer area extending only partially across said buffer area from said sound track towards said picture frames, and a digital time code on the film proximate to said picture frames for providing a digital identification of locations on the film, said digital time code comprising exposed portions of said buffer area that are readable by visible light that is absorbed by the color dyes of said film, at least a portion of said time code being unreadable by infrared radiation.

2. The motion picture sound film of claim 1, wherein the near edges of said picture frames are spaced about 0.304 inch from the edge of the film, the analog sound track is restricted to an area not greater than about 0.286 inch from the edge of the film, and the time code is provided within a buffer area greater than 0.286 inch but less than 0.304 inch from the edge of the film.

3. The motion picture sound film of claim 2, wherein said time code is provided within the area approximately 0.296 inch to 0.301 inch from the edge of the film.

4. A method of providing a digital location identifier on a motion picture film having a series of picture frames, comprising:

providing a film negative with said picture frames thereon, printing an analog sound track in a sound track area generally parallel to said picture frames on said film negative, simultaneously with printing said analog sound track, printing a digital code on said film negative in a buffer area between said picture frames and said analog sound track to identify said film locations, redeveloping said sound track area and a portion of said buffer area that extends partially but not fully into the buffer area so that said analog sound track is readable by infrared radiation but at least a portion of said digital code is unreadable by infrared radiation, the remainder of said buffer area isolating the picture frames from the redeveloped area, and making a print from said negative.

5. A method of providing a digital location identifier on a motion picture color film having a series of picture frames, comprising:

providing a film negative with said picture frames thereon, printing an analog sound track in a sound track area generally parallel to said picture frames on said film negative, simultaneously with printing said analog sound track, printing a digital code on said film negative in a buffer area between said picture frames and said analog sound track to identify said film locations, redeveloping said sound track area and a portion of said buffer area that extends partially but not fully into the buffer area, the remainder of said buffer area isolating the picture frames from the redeveloped area, and making a print from said negative, wherein the picture frames, the analog sound track and the digital code are exposed on said film, the exposed film is then developed, the film area exposed with the analog sound track and part but not all of the film area exposed with the digital code are then redeveloped so that the analog sound track can be read with infrared light, and then the film is finally fixed, said area of redevelopment extending less than fully into the digital code area so that at least a portion of the time code is unreadable by infrared light but the entire time code is readable by visible light having a color of said color film, said digital code area isolating the picture frames from the redeveloped area.

6. A method of producing a motion picture audio signal from a film which includes a series of picture frames and a digital time code parallel to said picture frames and identifying locations on the film, comprising:

exposing the time code on a partially redeveloped area of the film that also includes color film dyes, at least a portion of said time code being unreadable by infrared radiation, providing a digital signal storage device which permanently stores digital audio signals corresponding to successive locations on the film, reading the time code on the film by illuminating said partially redeveloped area with visible light that is absorbed by at least one of said dyes and by detecting the light transmitted through said partially redeveloped area, and accessing the digital signal storage device to retrieve therefrom the digital audio signals corresponding to the time code that has been read.

7. A method of producing a motion picture audio signal, comprising:

providing a motion picture color film which includes a series of picture frames on a developed portion of the film, an analog sound track on a redeveloped portion of the film that can be read by infrared light, and a digital time code between said picture frames and analog sound track on a partially redeveloped portion of the film, said digital time code being readable by visible light at a color of the motion picture but at least a portion of said time code being unreadable by infrared light, visibly projecting said motion picture frames, reading said time code with visible light at said motion picture color while the motion picture frames are being projected, using the time code read from said film to control the playing of a sound track for said film in synchronism with the projection of said motion picture frames, reading said analog sound track with infrared light while the motion picture frames are being projected, and inhibiting a theater playback of the analog sound track read from said film while synchronism is maintained between the projection of said motion picture frames and the playing of said sound track under the control of the time code read from said film.

\* \* \* \* \*